United States Patent
Marchlewski et al.

(10) Patent No.: US 10,005,497 B2
(45) Date of Patent: Jun. 26, 2018

(54) EXTRUDED ALUMINUM TAILGATE COVER WITH TRACK

(71) Applicant: Ford Global Technologies, LLC, Dearborn, MI (US)

(72) Inventors: Jack Marchlewski, Saline, MI (US); Joshua R. Hemphill, White Lake, MI (US); Robert Reiners, Grosse Ile, MI (US); Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 15/260,714

(22) Filed: Sep. 9, 2016

(65) Prior Publication Data
US 2018/0072353 A1    Mar. 15, 2018

(51) Int. Cl.
  *B62D 33/023*    (2006.01)
  *B62D 33/027*    (2006.01)
  *B60R 3/00*      (2006.01)

(52) U.S. Cl.
  CPC .......... *B62D 33/0273* (2013.01); *B60R 3/007* (2013.01)

(58) Field of Classification Search
  CPC ............................ B62D 33/0273; B60R 3/007
  See application file for complete search history.

(56) References Cited

U.S. PATENT DOCUMENTS

| | | | |
|---|---|---|---|
| 6,575,516 B2 | 6/2003 | Webber | |
| 7,717,445 B2 | 5/2010 | Peterson et al. | |
| 2015/0375804 A1 | 12/2015 | Gray et al. | |
| 2017/0101138 A1* | 4/2017 | Povinelli | B62D 35/007 |

\* cited by examiner

*Primary Examiner* — Lori L Lyjak
(74) *Attorney, Agent, or Firm* — Jason Rogers; Brooks Kushman, P.C.

(57) ABSTRACT

In one example, a tailgate assembly is provided that includes a front panel and a top panel adjacent to the front panel. A top cover is disposed on the upper panel and extends along the tailgate. A cover on the tailgate defines a T-shaped track that extends along the tailgate. The T-shaped track is configured to slidably receive a fastening element, and includes opposing lips spaced above a bottom track surface. The lips are configured to retain the fastening element.

16 Claims, 2 Drawing Sheets

EXTRUDED ALUMINUM TAILGATE COVER WITH TRACK

TECHNICAL FIELD

This disclosure relates to tailgate covers attached to a pick-up truck that are used to create a flat work surface, attach various accessories or work pieces, and for loading and unloading cargo.

BACKGROUND

Tailgates for pick-up trucks are often used to load and unload cargo to be transported in a pick-up truck bed. Additionally, they often act as a work surface for those individuals whom perform construction, maintenance, and lawn care work among others. Tailgates generally have a non-uniform surface and do not provide fastening elements configured to receive various tools, work pieces, or accessories. These uneven surfaces may make rolling or pushing cargo difficult. Moreover, the non-uniform surfaces may make for a poor work surface and offer few attachment points when one is attempting to secure a work piece to the tailgate.

SUMMARY

According to one aspect of this disclosure, a tailgate assembly is provided that includes a front panel and a top panel adjacent to the front panel. A top cover is disposed on the upper panel and it extends along the tailgate. A cover on the tailgate defines a T-shaped track that extends along the tailgate. The T-shaped track is configured to slidably receive a fastening element, and includes opposing lips spaced above a bottom track surface. The lips are configured to retain the fastening element.

The lips may be coplanar.

The T-shaped track includes a lower portion with a width of L and an upper portion with a width of U that is less than the width of L.

The track may have a U-Shape or a V-Shape.

The tailgate assembly may further comprise a latching mechanism disposed within the tailgate, and the tailgate and cover are arranged such that the latching mechanism is exposed when the cover is removed.

According to another aspect of this disclosure, the cover includes a first portion disposed on the upper surface and is adjacent to the top panel, and a second portion extending from the first portion and disposed on the front surface.

The first portion of the cover may define a T-shaped track extending along the width of the tailgate.

The cover and the top panel may be integrally formed as one piece.

According to another aspect of this disclosure, a tailgate assembly is provided for a pick-up truck. The tailgate assembly includes a cover on the tailgate defining a track extending to and between end portions of the tailgate, the track includes opposite edges configured to slidably receive a fastening element of an accessory, and a trough extending to and between the edges and terminating with spaced apart lips configured to retain the fastening element within the trough.

The lips of the cover may be co-planar.

The trough and lips may define a T-shape.

The T-shape may include a lower portion having a width L and an upper portion with a width U that is less than width L.

In yet another embodiment, the trough defines a U-shape or a V-Shape.

In another embodiment, the track is disposed on a panel of the tailgate partially defining a truck bed when the tailgate is in a closed position.

Optionally, the track is disposed on a top panel of the tailgate.

In another embodiment, the tailgate assembly may further comprise a latching mechanism disposed within the tailgate, wherein tailgate and cover are arranged such that the latching mechanism is exposed when the cover is removed.

According to another aspect of this disclosure, a tailgate cover is provided for a pick-up truck tailgate. The cover has a panel having an upper portion sized to extend along an upper portion of a truck tailgate and a lower portion. A flat surface extends between the upper and lower portions, wherein the panel defines a track extending to and between end portions of the tailgate. The track includes opposite edges configured to slidably receive a fastening element of an accessory, and a trough extending to and between the edges and terminating with spaced apart lips configured to retain the fastening element within the trough.

Optionally, the upper portion may outwardly extend from the panel.

The lips of the trough may be co-planar.

The trough and lips may define a T-shape.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
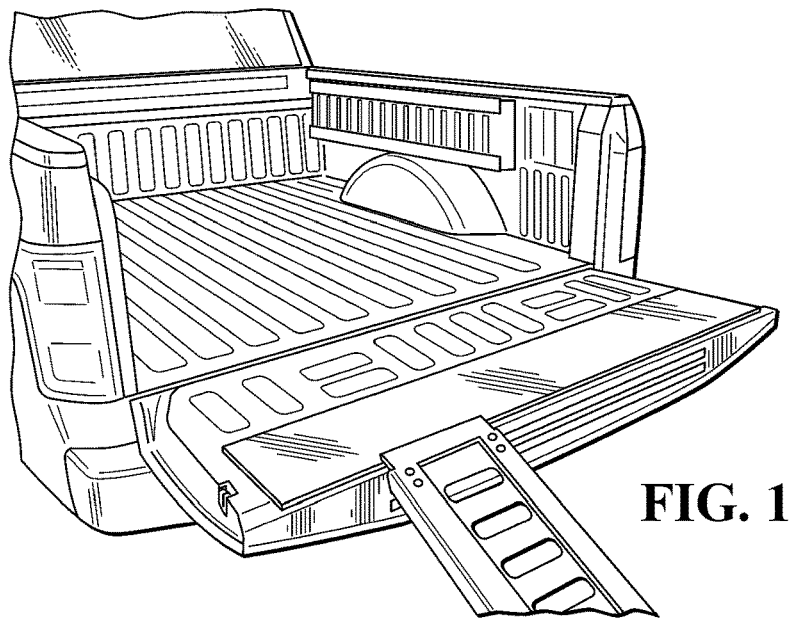
FIG. 1 is an environmental view of a tailgate assembly attached to a pick-up truck.

Referring to FIG. 1, a tailgate assembly attached to a pick-up truck is illustrated. The tailgate assembly includes a cover 12 and a channel that may receive a fastener.

Figure 2:
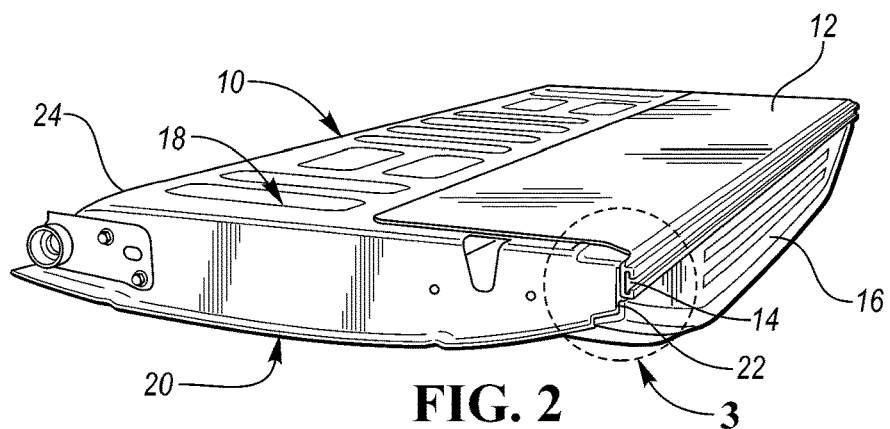
FIG. 2 is a left/front perspective view of a tailgate for a pick-up truck with the cover and a track disposed on the upper edge of the tailgate cover.

Referring to FIG. 2, a tailgate 10 for a pick-up truck is illustrated that includes a cover 12 and a top cover 16. The tailgate 10 may have a substantially rectangular shape and can be comprised of an interior panel and exterior panel connected to a lower panel and a top panel. A pivot point is positioned near the bottom panel 24. A cavity is formed by the hollow space created by the interior panel 18 and the exterior panel 20, that connect to the top panel 22 and the bottom panel 24. A latching mechanism (not shown) may be disposed within the cavity. The latching mechanism interacts with a handle disposed on the exterior panel 20, below the top panel 22. Optionally, the latching mechanism may include a lock or hook positioned within the tailgate configured to engage a bolt or striker on the truck bed. The lock or hook cooperates with the handle to unlock the tailgate from the truck bed.

A top cover 16 may be disposed on the top panel 22 of the tailgate 10. The top cover 16 is preferably made from a plastic material and operates to protect the exterior paint of the tailgate 10. Plastic material is defined to include any polymeric material such as thermoplastic, thermoset plastics or polymers.

Alternatively, the top cover 16 may be made from composite materials such as fiber-reinforced plastics. Fiber-reinforced plastics (also known as fiber-reinforced polymers) are composite materials made of a polymer matrix reinforced with fibers. The fibers may be glass, carbon, basalt, aramid or other appropriate reinforcing materials. The polymer may be an epoxy, vinyl ester, polyester thermosetting plastic, phenol formaldehyde resin, or other appropriate polymer or plastic. Fiber-reinforced plastics may also be heat and/or pressure cured.

The interior panel 18, or at least a portion thereof may have a number of ribs or other structural reinforcements formed therein. The ribs or bends create a non-uniform surface. A cover 12 is detachably connected to the interior panel 18 and optionally connected to the top panel 22. The cover 12 has a substantially flat surface that may extend from the top panel half way down the interior panel 18. Substantially flat refers to flatness having a tolerance of plus or minus 5 mm. The flat surface of the panel allows a user to slide a heavy object across the interior panel on a flat surface while unloading or loading cargo. Optionally, the cover 12 may be L-shaped, where the bottom portion of the L extends over the top panel 22. A track 14 may be formed either on the portion of the cover that is adjacent to the interior panel 18 or on the bottom portion of the L that is adjacent to the top panel, or both. As a part of the cover 12, a track 14 may be disposed on the top of the tailgate 10 adjacent to the top cover 16. Preferably, the track 14 which includes a trough has a profile in the shape of a T. The T has a lower portion with a width L and an upper portion with a width U. The width U is less than the width L. A fastener such as a standard T-nut 17 may be used to attach various tools and work pieces. In addition to a standard T-nut, various types of fasteners such as bolts, studs, rivets, caged nuts, or other mechanical fasteners can be utilized.

The fastener is designed to receive various tools or devices a user wishes to attach to a truck. For example, a loading ramp for loading and unloading cargo may be fastened or connected to the fastener. As another example, a device designed to hold a work piece, such as a vice, clamp, jig or fixture could be mounted to the fastener. In yet another example, a tool may be mounted to the fastener to provide a user to a suitable working area. A tool could include a drill, lathe, belt sander, cutting wheel, and various types of saws or cutting devices among others.

Figure 3:
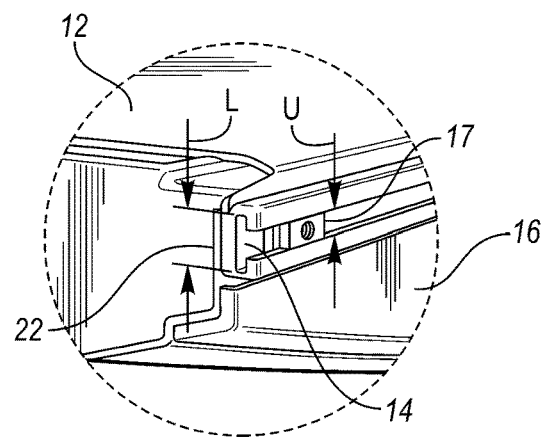
FIG. 3 is a detailed view of the track positioned along the upper edge of the tailgate.
Figure 4:
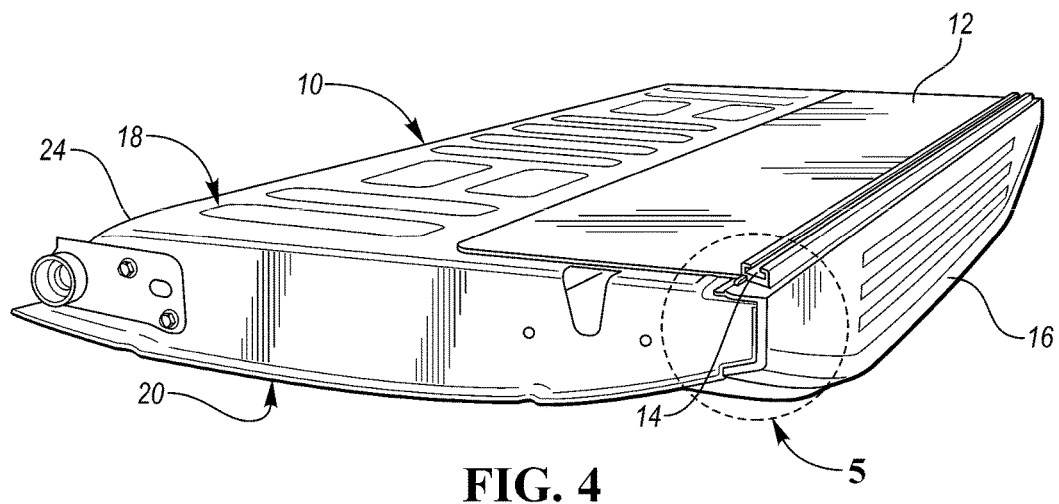
FIG. 4 is a left/front perspective view of a tailgate for a pick-up truck with the cover and a track disposed on the front wall of the cover.

Referring to FIG. 3, a tailgate 10 for a pick-up truck is illustrated that includes a cover 12 and a top cover 16. The tailgate may have a substantially rectangular shape and can be comprised of an interior panel and exterior panel connected to a lower panel and a top panel. A pivot point is positioned near the bottom panel 24. A cavity is formed by the hollow space created by the interior panel 18 and the exterior panel 20, that connect to the top panel 22 and the bottom panel 24. A latching mechanism (not shown) may be disposed within the cavity. The latching mechanism interacts with a handle disposed on the exterior panel 20, below the top panel 22. Optionally, the latching mechanism may include a lock or hook positioned within the tailgate configured to engage a bolt or striker on the truck bed. The lock or hook cooperates with the handle to unlock the tailgate from the truck bed.

A top cover 16 may be disposed on the top panel 22 of the tailgate 10. The top cover 16 is preferably made from a plastic material and operates to protect the exterior paint of the tailgate 10. Plastic material is defined to include any polymeric material such as thermoplastic, thermoset plastics or polymers.

Alternatively, the top cover 16 may be made from composite materials such as fiber-reinforced plastics. Fiber-reinforced plastics (also known as fiber-reinforced polymers) are composite materials made of a polymer matrix reinforced with fibers. The fibers may be glass, carbon, basalt, aramid or other appropriate reinforcing materials. The polymer may be an epoxy, vinyl ester, polyester thermosetting plastic, phenol formaldehyde resin, or other appropriate polymer or plastic. Fiber-reinforced plastics may also be heat and/or pressure cured.

The interior panel 18, or at least a portion thereof may have a number of ribs or other structural reinforcements formed therein. The ribs or bends create a non-uniform surface. A cover 12 is detachably connected to the interior panel 18 and optionally connected to the top panel 22. The cover 12 has a substantially flat surface that may extend from the top panel half way down the interior panel 18. Substantially flat refers to flatness having a tolerance of plus or minus 5 mm. The flat surface of the panel allows a user to slide a heavy object across the interior panel on a flat surface while unloading or loading cargo.

Figure 5:
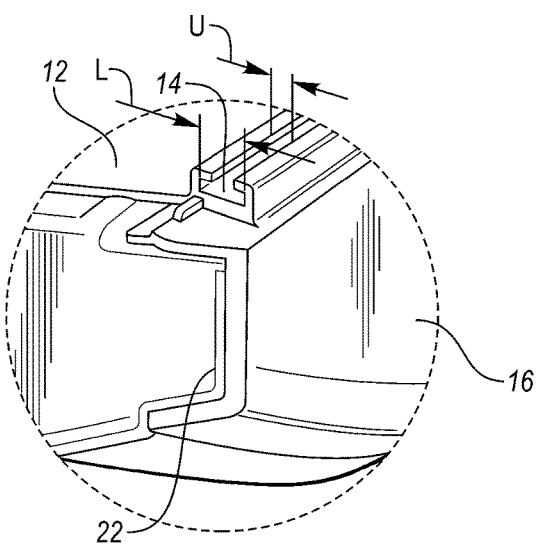
FIG. 5 is a detailed view of the access being integrated with the top cover of the tailgate.

Referring to FIG. 5, the cover 12 is shown as integrally formed with the top cover 16. The cover 12 is disposed on the interior panel 18 and the top portion of the cover 12 extends over the top of the tailgate 10. The cover 12 integrally formed with the top cover could be made from various materials and processes. In the preferred embodiment, the integrated panel and top cover is made up of extruded aluminum. Extruded aluminum advantageously allows a user to create complicated cross-sections and an excellent surface finish.

A track 14 may be formed either on the portion of the cover that is adjacent to the interior panel 18 or on the bottom portion of the L that is adjacent to the top panel, or both. As a part of the cover 12, a track 14 may be disposed on the top of the tailgate 10 adjacent to the top cover 16. Preferably the track has a trough which terminates with a pair of lips that define a profile in the shape of a T. The T has a lower portion with a width L and an upper portion with a width U. The width U is less than the width L. A fastener (not shown) such as a standard T-nut is used to connect various tools or work pieces and may be disposed within the track or channel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tailgate assembly comprising:
a truck tailgate having a front panel and an upper panel adjacent to the front panel;
a top cover disposed on the upper panel extending along the tailgate; and
a cover on the tailgate defining a T-shaped track extending along the tailgate configured to slidably receive a fastening element, the T-shaped track including opposing lips spaced above a bottom track surface, wherein the lips are configured to retain the fastening element.

2. The tailgate assembly of claim 1, wherein the lips are coplanar.

3. The tailgate assembly of claim 1, wherein the T-shaped track includes a lower portion having a width L and an upper portion with a width U that is less than width L.

4. The tailgate assembly of claim 1, wherein the cover includes a first portion disposed on the upper panel and adjacent to the top cover, and a second portion extending from the first portion and disposed on the front panel.

5. The tailgate assembly of claim 4, wherein the first portion of the cover defines a T-shaped track extending along a width of the tailgate.

6. The tailgate assembly of claim 4, wherein the cover and the top cover are integrally formed as one piece.

7. A tailgate assembly comprising:
a tailgate; and
a cover on the tailgate defining a track extending to and between end portions of the tailgate, the track including opposite edges configured to slidably receive a fastening element of an accessory, and a trough extending to and between the edges and terminating with spaced apart lips configured to retain the fastening element within the trough.

8. The tailgate assembly of claim 7, wherein the lips are co-planar.

9. The tailgate assembly of claim 8, wherein the trough and lips define a T-shape.

10. The tailgate assembly of claim 9, wherein the T-shape includes a lower portion having a width L and an upper portion with a width U that is less than width L.

11. The tailgate assembly of claim 7, wherein the track is disposed on a panel of the tailgate partially defining a truck bed when the tailgate is in a closed position.

12. The tailgate assembly of claim 7, wherein the track is disposed on a top panel of the tailgate.

13. A tailgate cover comprising:
a panel having an upper portion sized to extend along an upper portion of a truck tailgate;
a lower portion; and
a flat surface disposed between the upper and lower portions, wherein the panel defines a track extending to and between end portions of the tailgate, the track including opposite edges configured to slidably receive a fastening element of an accessory, and a trough extending to and between the edges and terminating with spaced apart lips configured to retain the fastening element within the trough.

14. The tailgate cover of claim 13, wherein the upper portion outwardly extends from the panel.

15. The tailgate cover of claim 13, wherein the lips are co-planar.

16. The tailgate cover of claim 13, wherein the trough and lips define a T-shape.

* * * * *